United States Patent
Owejan et al.

(10) Patent No.: US 8,389,182 B2
(45) Date of Patent: Mar. 5, 2013

(54) BIPOLAR PLATE WITH REDUCED COOLANT VOLUME AND ASYMMETRIC HEAT REMOVAL

(75) Inventors: Jon P. Owejan, Honeoye, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 12/695,611

(22) Filed: Jan. 28, 2010

(65) Prior Publication Data
US 2011/0183235 A1   Jul. 28, 2011

(51) Int. Cl.
*H01M 8/02* (2006.01)
*H01M 8/10* (2006.01)

(52) U.S. Cl. ......... 429/518; 429/433; 429/457; 429/514

(58) Field of Classification Search ................. 429/433, 429/457, 512, 514, 518; 427/115
See application file for complete search history.

(56) References Cited

U.S. PATENT DOCUMENTS

| | | | |
|---|---|---|---|
| 3,515,593 A * | 6/1970 | Nickols, Jr. .................. 429/434 |
| 6,338,492 B1 * | 1/2002 | Schilling et al. .............. 277/630 |
| 7,429,429 B2 | 9/2008 | Breault | |
| 2004/0033410 A1 * | 2/2004 | Brady et al. .................... 429/34 |
| 2005/0053810 A1 | 3/2005 | Kato et al. | |
| 2008/0050629 A1 * | 2/2008 | Lin et al. ......................... 429/26 |
| 2009/0104476 A1 | 4/2009 | Ji et al. | |

FOREIGN PATENT DOCUMENTS

FR   2896623 A1 *   7/2007

\* cited by examiner

*Primary Examiner* — Gregg Cantelmo
(74) *Attorney, Agent, or Firm* — Dinsmore & Shohl LLP

(57) ABSTRACT

A bipolar plate assembly is described. The coolant passage on either the anode side or the cathode side includes a material having a low thermal conductivity. Fuel cells containing the bipolar plate assembly and methods of making the bipolar plate assembly are also described.

18 Claims, 4 Drawing Sheets

BIPOLAR PLATE WITH REDUCED COOLANT VOLUME AND ASYMMETRIC HEAT REMOVAL

STATEMENT OF RELATED CASES

This application is related to U.S. application Ser. No. 12/567,842 entitled Fuel Cell With Anode And Cathode Plate Temperature Difference, filed Sep. 28, 2009, which is incorporated herein by reference.

FIELD OF THE INVENTION

The invention relates generally to fuel cells and more particularly to bipolar plates used in them.

BACKGROUND OF THE INVENTION

Electrochemical conversion cells, commonly referred to as fuel cells, which produce electrical energy by processing first and second reactants, e.g., through oxidation and reduction of hydrogen and oxygen. By way of illustration and not limitation, a typical polymer electrolyte fuel cell comprises a polymer membrane (e.g., a proton exchange membrane) that is positioned between a pair of catalyst layers with a pair of gas diffusion media layers outside the catalyst layers. A cathode plate and an anode plate are positioned at the outermost sides adjacent the gas diffusion media layers, and the preceding components are tightly compressed to form the cell unit.

The voltage provided by a single cell unit is typically too small for useful applications. Accordingly, a plurality of cells are typically arranged and connected consecutively in a "stack" to increase the electrical output of the electrochemical conversion assembly or fuel cell. The fuel cell stack typically uses bipolar plates between adjacent MEAs.

In the operation of conventional fuel cells, the through-plane water vapor concentration gradient on the anode side causes excessive condensation. The net water flux often does not go to the cathode side. However, the cathode is able to handle liquid water better than the anode. In addition, for optimal freeze start performance, it is desirable to reduce coolant volume within the bipolar plate.

Therefore, there is a need for a fuel cell having an improved water management.

SUMMARY OF THE INVENTION

The present invention meets this need. One aspect of the invention is a bipolar plate assembly. In one embodiment, the bipolar plate assembly has a first side and a second sides. The first sub-plate has a reactant passage which is open on the first side, and a land region adjacent to the reactant passage. The second sub-plate has a reactant passage which is open on the second side, and a land region adjacent to the reactant passage in the second sub-plate. The land region in the first sub-plate is filled with a material having a low thermal conductivity, and the land region in the second sub-plate is filled with a coolant during use.

In another embodiment, the first side has a reactant passage and a coolant passage adjacent to the reactant passage. At least one wall of the coolant passage is made of a material having a low thermal conductivity. The second side has a reactant passage and no coolant passage. The coolant passage on the first side is filled with a coolant during use.

Another aspect of the invention method of making a bipolar plate assembly. In one embodiment, the method includes providing a first sub-plate with a reactant passage which is open on the first side, and a land region adjacent to the reactant passage in the first sub-plate; providing a second sub-plate with a reactant passage which is open on the second side, and a land region adjacent to the reactant passage in the second sub-plate; filling the land region in the first sub-plate with a material having a low thermal conductivity; and sealing the first sub-plate adjacent to the second sub-plate.

Another aspect of the invention involves a fuel cell utilizing the bipolar plate assembly. In one embodiment, the fuel cell includes at least two membrane electrode assemblies separated from each other by a distance, each membrane electrode assembly having an anode side and a cathode side; at least one bipolar plate assembly located between the anode side of one of the membrane electrode assemblies and the cathode side of another of the membrane electrode assemblies, the bipolar plate assembly having: a first sub-plate with a reactant passage which is open to the anode side of the one of the pair of membrane electrode assemblies, and a land region adjacent to the reactant passage in the first sub-plate; and a second sub-plate with a reactant passage which is open to the cathode side of another of the membrane electrode assemblies and a land region adjacent to the reactant passage in the second sub-plate; wherein the land region in the first sub-plate or the land region in the second sub-plate is filled with a material having a low thermal conductivity and wherein the land region in the other of the first sub-plate or the second sub-plate is filled with a coolant.

DETAILED DESCRIPTION OF THE INVENTION

Improved water management can be achieved by adjusting the through-plane temperature gradient of the fuel cell. This can be achieved by providing a bipolar plate assembly in which the coolant passage on one side includes a material having a low thermal conductivity, while the coolant passage on the other side contains coolant during use. Alternatively, the bipolar plate can have a coolant passage on only one side, and one or more walls of the coolant passage can be made of a material having a low thermal conductivity.

Figure 1:
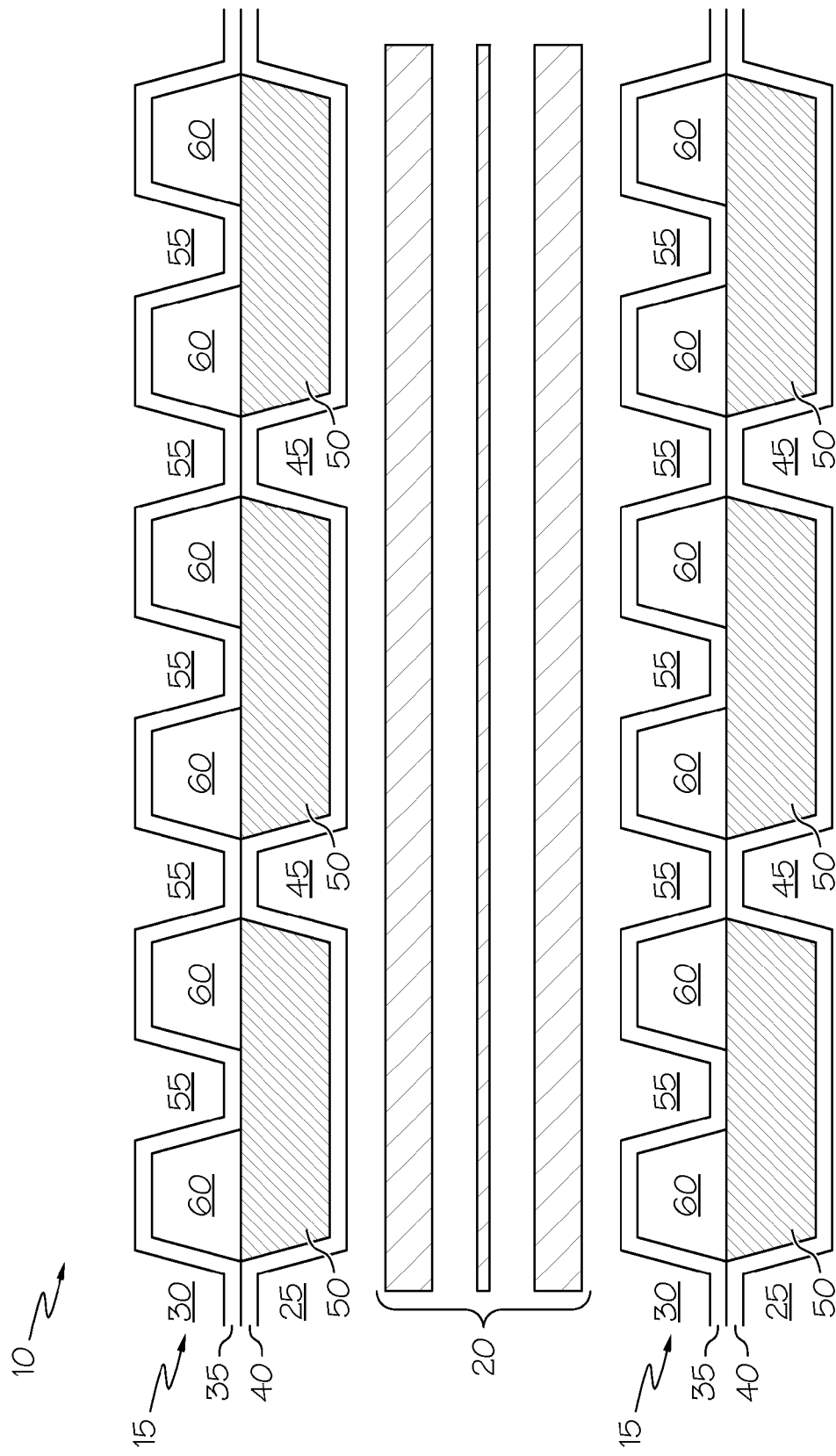
FIG. 1 is an illustration of one embodiment of a bipolar plate.

FIG. 1 shows one embodiment of a fuel cell 10 according to the present invention. The fuel cell 10 has a pair of non-nested bipolar plates 15 on opposite sides of an MEA 20. The bipolar plates 15 have an anode side 25 and a cathode side 30. The bipolar plates 15 are made of two corrugated conductive plates 35, 40 which are sealed together, for example, by welding, elastomeric seal, or by adhesive bonding. Suitable conductive plates can be made of a material including, but not limited to, metals, carbon composites, conductive polymers, or metal plated polymers.

The anode side 25 has an anode reactant passage 45 which is open to the anode side of the MEA 20. The anode reactant passage 45 is separated by anode lands 50. The cathode side 30 has a cathode reactant passage 55 which is open to the cathode side of the MEA 20. The cathode reactant passage 55 is separated by cathode coolant passages 60. Coolant flows through cathode coolant passages 60.

Before the two corrugated plates 35, 40 are sealed together, the anode lands 50 are filled (partially or completely) with a material having a low thermal conductivity. By low thermal conductivity, we mean that the thermal conductivity is much less than that of stainless steel (about 15 W/mK), such as less than about 0.5 W/mK, or less than about 0.3 W/mK, or less than about 0.2 W/mK, or less than about 0.1 W/mK, or less than about 0.05 W/mK, or less than about 0.03 W/mK.

In general, suitable materials having low thermal conductivity include, but are not limited to, polymers, foams, and gases.

In the arrangement of FIG. 1 where the anode lands are exposed to the coolant, it is desirable that the material having a low thermal conductivity be impermeable to the coolant. Otherwise, the coolant would infiltrate the material, which might reduce its effectiveness. However, this is not required. Suitable impermeable materials having low conductivity include, but are not limited to closed cell foams and polymers. One example of a suitable foam is a closed cell urethane foam (e.g., a closed cell urethane foam with a k of 0.022 W/mK), or a closed cell foamed polystyrene. Suitable polymers include, but are not limited to, polyolefin, polyethylene, polyurethane, and polystyrene. Polymers typically have a thermal conductivity of about 0.2 W/mK.

The use of these insulated bipolar plates allows the thermal conductivity of the system to be changed without changing the electrical conductivity.

Additionally, rapid prototyping techniques could be used to form a land insulating layer. These processes can include but are limited to, stereolithography, or 3D printing.

Figure 2:
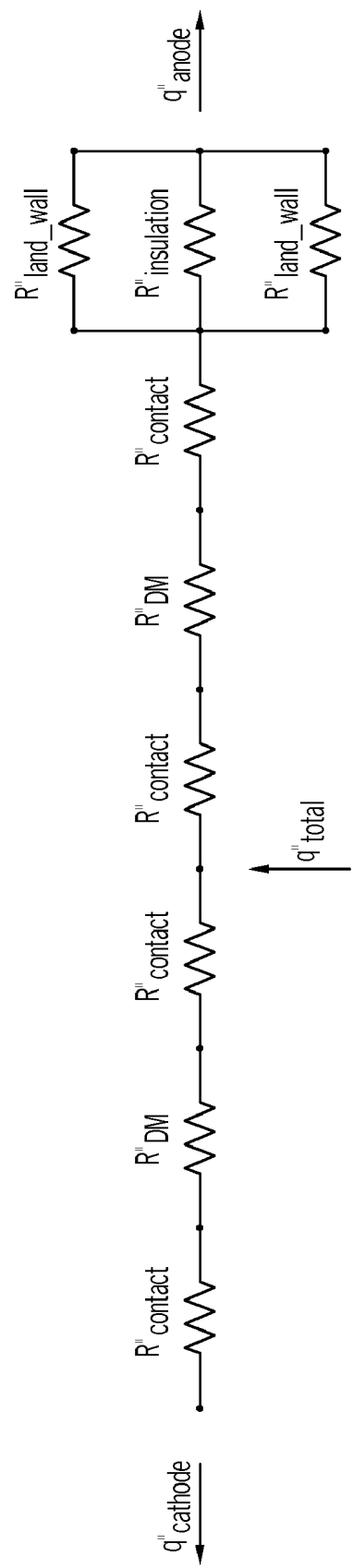
FIG. 2 is an illustration of a simplified heat transfer circuit for an insulated anode land.

FIG. 2 shows a simplified heat transfer circuit for an insulated anode land. The bipolar plate design will decrease the anode heat flux by approximately 20% with symmetric diffusion media (DM) at high current density. This results in a membrane temperature increase of about 0.5° C. over the typical MEA temperature of about 3-6° C. higher than the coolant (depending on the DM thermal conductivity) for a current density of 1.5 A/cm$^2$. Moreover, with the land insulated, its temperature on the anode will increase by 1.5° C., thereby decreasing the anode through-plane temperature differential by about 1° C. and increasing the cathode differential by about 0.5° C. At 80° C., this will effectively decrease the anode water vapor concentration gradient by 12% while increasing the cathode by 9%, thus shifting more water vapor transport to the cathode. These calculations are exemplary of the type of change that can be obtained using the insulated bipolar plate assembly. The calculations are highly dependent on the length scales in the structure. For example, if the depth of the anode channels was increased, making the layer of insulation thicker, the magnitude of the temperature gradients would increase.

The water balance shift could be further modified with an asymmetric DM having variations in thermal conductivity and thickness. Examples of this include, but are not limited to, those described in U.S. application Ser. No. 12/567,842, entitled Fuel Cell With Anode And Cathode Plate Temperature Difference, filed Sep. 28, 2009 now U.S. Pat. No. 8,323,842, issued on Dec. 4, 2012; U.S. Publication No. 2009/0104476, entitled Fuel Cell Stack With Asymmetric Diffusion Media On Anode And Cathode; and U.S. Pat. No. 7,429,429, Fuel Cell with Thermal Conductance of Cathode Greater than Anode, each of which is incorporated herein by reference.

Figure 3:
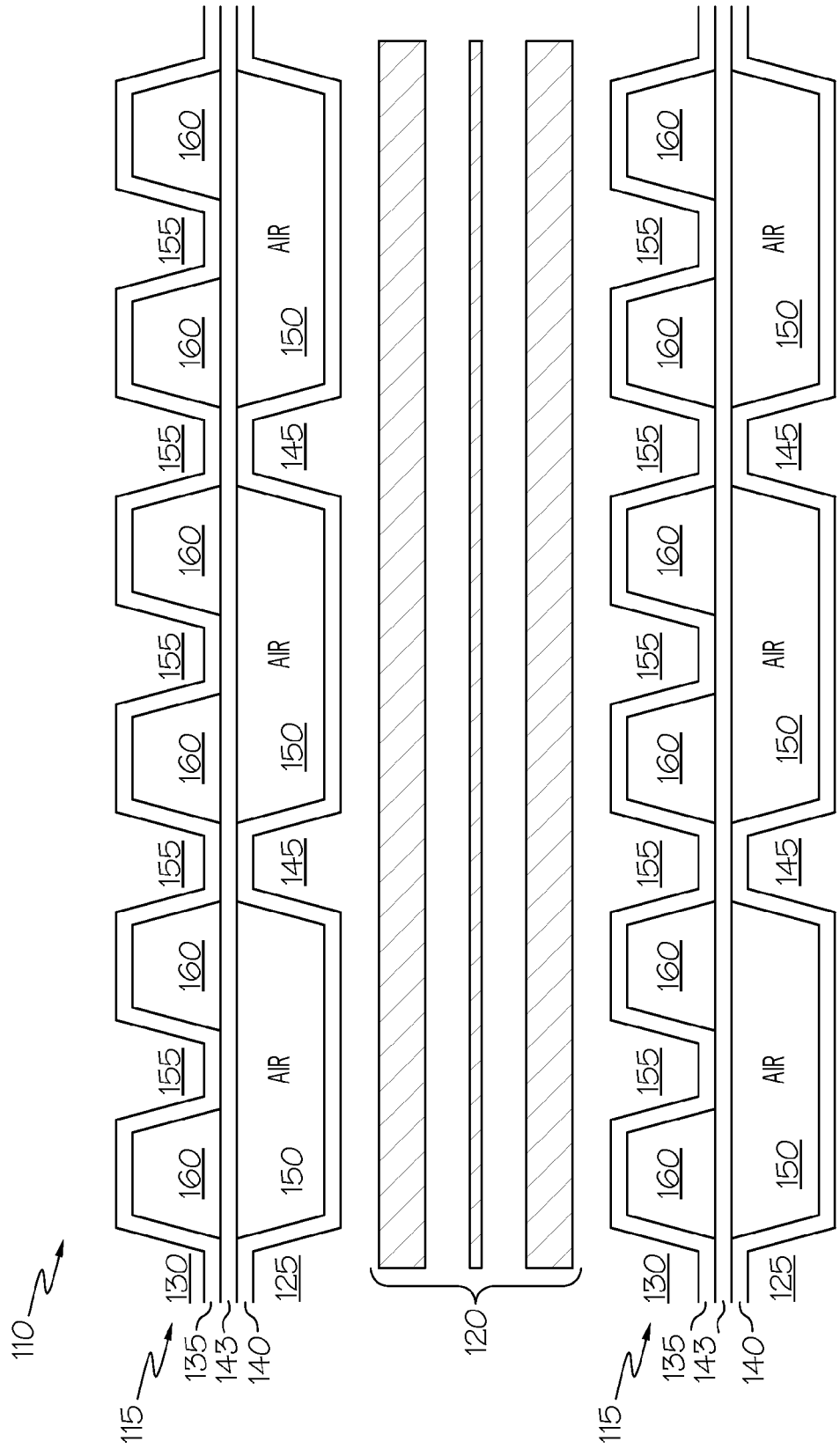
FIG. 3 is an illustration of another embodiment of a bipolar plate.

FIG. 3 shows another embodiment of a fuel cell 110 according to the present invention. The fuel cell 110 has a pair of non-nested bipolar plates 115 on opposite sides of the MEA 120. The bipolar plates 115 have an anode side 125 and a cathode side 130. The bipolar plates 15 are made of two corrugated plates 135, 140 on opposite sides of a center plate 143. The center plate is made of a conductive material, as discussed above.

The anode side 125 has an anode reactant passage 145 which is open to the anode side of the MEA 120. The anode reactant passage 145 is separated by anode lands 150. The cathode side 130 has a cathode reactant passage 155 which is open to the cathode side of the MEA 120. The cathode reactant passage 155 is separated by cathode coolant passages 160. Coolant flows through the cathode coolant passages 160 during use.

When the center plate is sealed to corrugated plates 135 and 140, the anode lands 150 are filled with the low conductivity material. The center plate can be sealed to the corrugated plates by any suitable method, typically by welding. A metal foil can be used as the center plate.

Suitable materials having low conductivity for this embodiment include, but are not limited to, foams, polymers, and gases. Because the center plate seals the coolant away from the material having low thermal conductivity, an impermeable material in not needed, although one can be used if desired. Open or closed cell foams can be used. Suitable polymers include, but are not limited to, polyolefin, polyethylene, polyurethane, and polystyrene. Suitable gases include, but are not limited to, air, nitrogen, helium, argon, carbon dioxide. A vacuum could also be used, but it would be more difficult to produce the bipolar plate with a vacuum.

The advantage of the center plate arrangement is that gases can be used as the material having low conductivity. Although it requires an additional metal layer, no additional insulating material (other than the gas) is needed. Air is the preferred gas.

The use of the metal center plate allows the creation of additional structures with favorable features and the use of additional low conductivity materials. However, this should be balanced against the added cost and mass of the additional sheet of metal. The center plate can have stamped features in the tunnel and cross-flow regions, if desired.

Figure 4:
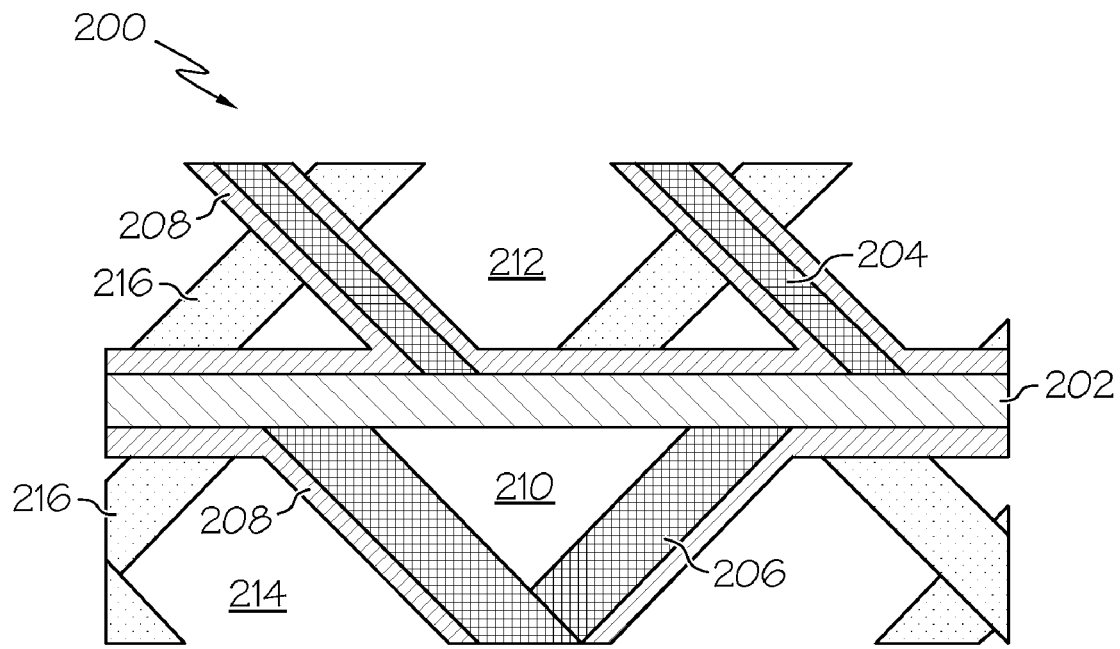
FIG. 4 is an illustration of another embodiment of a bipolar plate.

FIG. 4 shows another embodiment of the bipolar plate. With this manufacturing process, the bipolar plate is formed as a single part by a photo polymerization process with metal plating for conductivity. The land insulation is achieved by adding polymer or by creating a gas filled layer as previously described. The photopolymerization process for bipolar plates is described in U.S. application Ser. No. 12/341,062, filed Dec. 22, 2008 now U.S. Pat. No. 8,268,510, issued on Sep. 18, 2012, entitled Fuel Cell Fabrication Using Photopolymer Based Processes; and U.S. application Ser. No. 12/466,405 now U.S. Pat. No. 8,309,274, issued on Nov. 13, 2012, filed May 15, 2009, entitled Separator Plates Formed by Photopolymer Based Processes, each of which is incorporated herein by reference.

Figure 5:
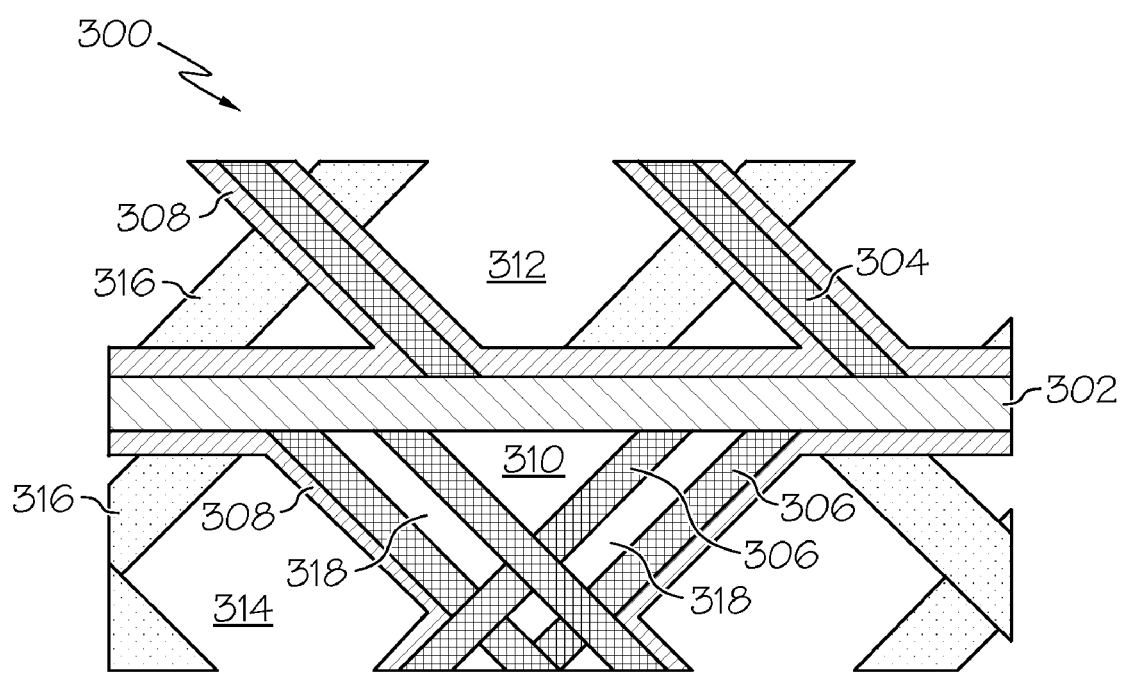
FIG. 5 is an illustration of another embodiment of a bipolar plate.

Using a photopolymer process, patterns can be created to generate the reactant and coolant passages. The photopolymer part would then be metal plated to render the part electrically and thermally conductive. An example of a photopolymer plate 200 using a thicker layer of polymer to insulate the coolant channel from one side is shown in FIG. 4. The plate 200 is built onto a metal foil 202 by exposing and developing photopolymer material to form trusses 204 for reactant passages 212 and 214 and walls 206 for coolant passages 210. The walls 206 for the coolant passages 210 are thicker to reduce the heat flux from one reactant side. The polymer structure is plated with metal 208. The plated trusses 216 not in the section view are also shown. An example of a photopolymer plate 300 using a gas layer for insulation is shown in FIG. 5 where like parts are labeled as 3xx. The plate 300 is built onto a metal foil 302 by exposing and developing photopolymer material to form trusses 304 for reactant passages 312 and 314, and walls 306 for coolant passages 310 and gas layers 318 as shown. As the photopolymer exposure process is line of sight, the walls 306 of the coolant passage 310 extend through the gas layer 318. The gas layer 318 provides insulation to reduce the heat flux from one reactant side. The polymer structure is plated with metal 308. The plated trusses 316 not in the section view are also shown.

Although the use of a low conductivity material in the anode lands is described, alternatively the cathode lands could be filled with a material which alters the through-plane temperature gradient.

An advantage of these bipolar plates is that the volume of coolant is reduced compared to a standard fuel cell.

This type of bipolar plate can be used in combination with the approaches to obtaining a temperature differential across the fuel cell discussed in U.S. application Ser. No. 12/567,842, which is incorporated herein by reference, if desired.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A bipolar plate assembly having a first side and a second side, the bipolar plate assembly comprising:
   a first sub-plate with a reactant passage which is open on the first side, and a land region adjacent to the reactant passage; and
   a second sub-plate with a reactant passage open on the second side, and a land region adjacent to the reactant passage in the second sub-plate;
   wherein the land region in the first sub-plate is filled with a polymeric material having a low thermal conductivity, and wherein the land region in the second sub-plate is filled with coolant during use such that the thermal conductivity of the bipolar plate assembly is changed without changing electrical conductivity.

2. The bipolar plate assembly of claim 1 wherein the polymeric material having the low thermal conductivity is a foam.

3. The bipolar plate assembly of claim 2 wherein the foam is a closed cell urethane foam or a closed cell polystyrene foam.

4. The bipolar plate assembly of claim 1 further comprising a third sub-plate sealed between the first and second sub-plates.

5. The bipolar plate assembly of claim 4 wherein the third sub-plate is made of a conductive material.

6. The bipolar plate assembly of claim 4 wherein the polymeric material having the low thermal conductivity is a foam.

7. A bipolar plate assembly having a first side and a second side, the bipolar plate assembly comprising:
   the first side having a reactant passage and a coolant passage adjacent to the reactant passage, at least one wall of the coolant passage made of a material having a low thermal conductivity; and
   the second side having a reactant passage and no coolant passage;
   wherein the coolant passage on the first side is filled with a coolant during use and wherein the at least one wall of the coolant passage is thicker than the other walls of the coolant passage.

8. The bipolar plate assembly of claim 7 wherein the material having the low thermal conductivity is a radiation sensitive material.

9. The bipolar plate assembly of claim 8 wherein the radiation sensitive material is a photopolymer.

10. The bipolar plate assembly of claim 7 wherein the at least one wall of the coolant passage comprises an inner wall and an outer wall separated by a space, the space being filled with a gas.

11. A method of making a bipolar plate assembly having a first side and a second side, the method comprising:
   providing a first sub-plate with a reactant passage which is open on the first side, and a land region adjacent to the reactant passage in the first sub-plate;
   providing a second sub-plate with a reactant passage which is open on the second side, and a land region adjacent to the reactant passage in the second sub-plate;
   filling the land region in the first sub-plate with a polymeric material having a low thermal conductivity such that the thermal conductivity of the bipolar plate assembly is changed without changing electrical conductivity; and
   sealing the first sub-plate adjacent to the second sub-plate.

12. The method of claim 11 wherein the polymeric material having the low thermal conductivity is a foam.

13. The method of claim 12 wherein the foam is a closed cell urethane foam or a closed cell polystyrene foam.

14. The method of claim 11 further comprising positioning a third sub-plate between the first and second sub-plates, and sealing the first and second sub-plates to the third sub-plate.

15. The method of claim 14 wherein the third sub-plate is sealed to the first sub-plate after the land region of the first sub-plate is filled with the polymeric material having the low thermal conductivity.

16. A fuel cell comprising:
   a pair of endplates having reactant flow channels;

at least two membrane electrode assemblies separated from each other by a distance, each membrane electrode assembly having an anode side and a cathode side;

at least one bipolar plate assembly located between the anode side of one of the membrane electrode assemblies and the cathode side of another of the membrane electrode assemblies, the bipolar plate assembly having:

a first sub-plate with a reactant passage which is open to the anode side of the one of the membrane electrode assemblies, and a land region adjacent to the reactant passage in the first sub-plate; and a second sub-plate with a reactant passage which is open to the cathode side of another of the membrane electrode assemblies and a land region adjacent to the reactant passage in the second sub-plate;

wherein the land region in the first sub-plate or the land region in the second sub-plate is filled with a polymeric material having a low thermal conductivity and wherein the land region in the other of the first sub-plate or the second sub-plate is filled with a coolant such that the thermal conductivity of the bipolar plate assembly is changed without changing electrical conductivity.

17. The fuel cell of claim 16 wherein the polymeric material having the low thermal conductivity is a foam.

18. The fuel cell of claim 16 further comprising a third sub-plate sealed between the first and second sub-plates.

* * * * *